Feb. 17, 1931.  H. C. HARRISON  1,792,637
VIBRATION TRANSMISSION SYSTEM
Filed June 21, 1927
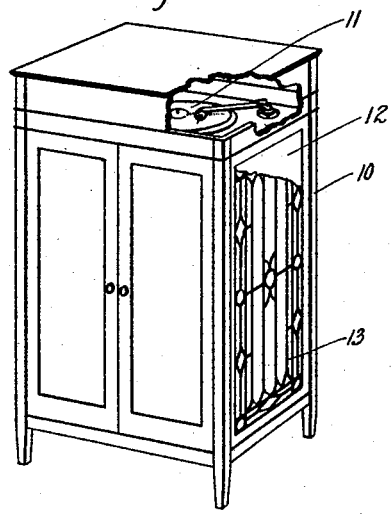
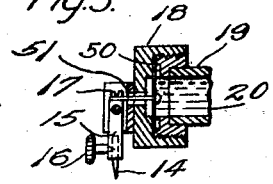
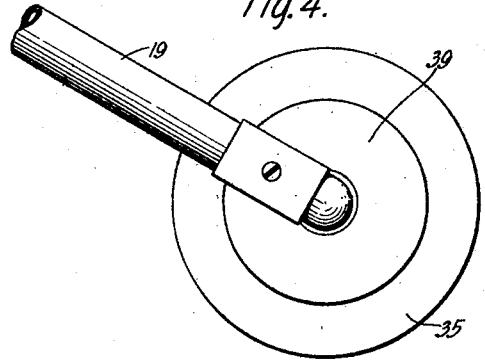
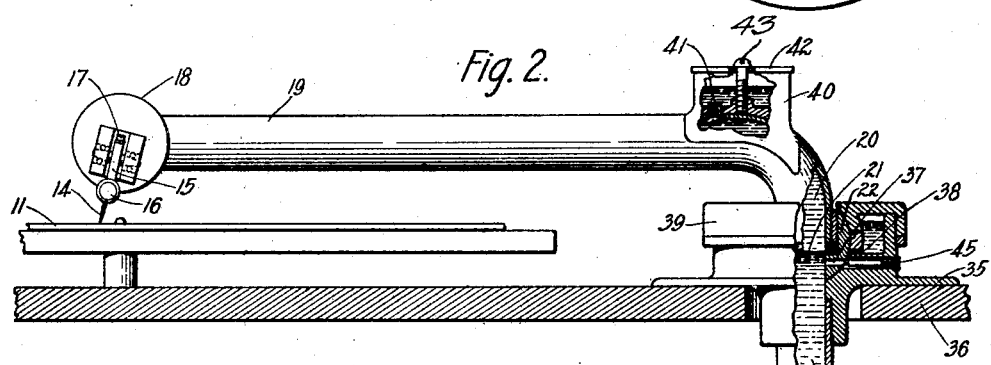
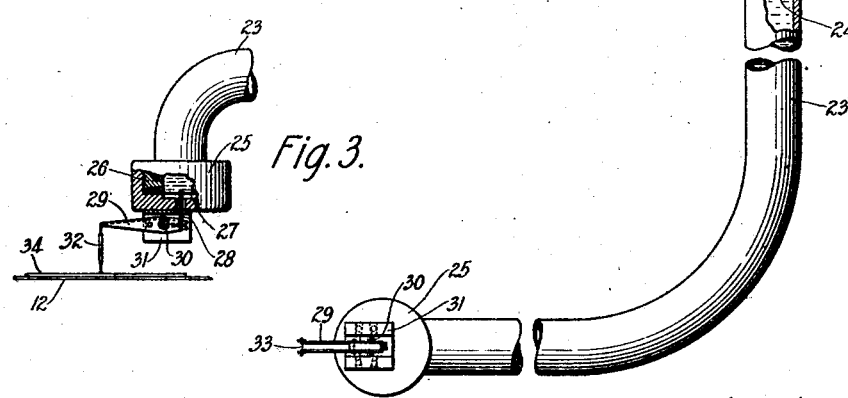
Inventor:
Henry C. Harrison
by Joel C. R. Palmer
Attorney Patented Feb. 17, 1931

1,792,637

UNITED STATES PATENT OFFICE

HENRY C. HARRISON, OF PORT WASHINGTON, NEW YORK, ASSIGNOR TO BELL TELEPHONE LABORATORIES, INCORPORATED, OF NEW YORK, N. Y., A CORPORATION OF NEW YORK

VIBRATION-TRANSMISSION SYSTEM

Application filed June 21, 1927. Serial No. 200,473.

This invention relates to a fluid vibration transmission system and particularly to a hydraulic system for receiving vibrations from a phonograph record and transmitting them to the diaphragm of a sound radiator.

In accordance with the embodiment of the invention herein shown and described, a hydraulic vibration transmission system is employed in a phonograph for transmitting vibrations from a phonograph needle to the direct acting diaphragm of a sound radiator located in the phonograph cabinet and driven at a position remote from the needle. A plurality of conduits filled with oil or other fluid having a high ratio of elasticity to density are employed for this purpose. A diaphragm to which the phonograph needle is connected closes a portion of one of the conduits while another portion of this conduit is closed by a flexible membrane so as to permit the movement of one conduit with respect to the other without spilling the fluid. The fluid in a second conduit is in contact with this flexible membrane and a diaphragm which is connected to the direct acting diaphragm of the sound radiator closes a portion of this second conduit. In order that the needle may be moved in a horizontal direction or raised vertically from the record, a universal joint sufficiently tight to make the leakage mechanical impedance high is provided between the two conduits. Means are also provided for maintaining the conduits filled with fluid at a substantially constant pressure and parts are designed to minimize spillage and leakage.

The invention may be better understood by referring to the following description in conjunction with the accompanying drawing in which:

Fig. 1 is a perspective view of a phonograph employing a hydraulic vibration transmission system constructed in accordance with this invention;

Fig. 2 is an enlarged side view partly in section of the hydraulic vibration transmission system which is employed in the phonograph of Fig. 1;

Fig. 3 is a view of a portion of the hydraulic vibration transmission system showing the coupling between it and a direct acting diaphragm;

Fig. 4 is a top view of a portion of Fig. 2 showing the universal joint connection between two conduits of the hydraulic vibration transmission system; and Fig. 5 is a view in cross-section of a portion of the vibration transmission system showing the connection of the needle arm to the diaphragm.

Referring to the drawing, the hydraulic vibration transmission system is shown mounted in a phonograph cabinet 10 and serves to transmit vibrations received from the sound record 11 to a direct acting diaphragm or sound radiator 12 which fits into a large opening in the front of cabinet 10. This diaphragm may be any type which is capable of reproducing speech and music faithfully, as for instance, a thin metallic diaphragm tensioned to a high degree. A decorative screen 13 serves to protect the diaphragm from accidental contact.

A phonograph needle 14 is secured to a needle arm 15 by means of a thumb set screw 16. One end of a connecting rod is secured to the needle arm 15 by means of a screw 17 and the other end of this rod is connected to a diaphragm mounted in a housing member 18 to which one end of a conduit 19 is attached, this conduit being filled with a liquid 20 such as oil or other fluid having a high ratio of elasticity to density.

The other end of this conduit is closed by a flexible diaphragm or membrane 21 and is secured to a ball member 22 which fits into the socket portion of a universal joint. This joint serves to connect the conduit 19 with a second conduit 23, filled with a fluid 24, preferably similar to the fluid 20. The end of conduit 23 remote from the universal joint is secured to a housing member 25 similar to the housing member 18.

Fig. 3 shows the details of the connecting means between the hydraulic vibration transmission system and the direct acting diaphragm 12. An annular member 26 to which a diaphragm 27 is secured engages an internally threaded portion of the housing member 25. The conduit 23 is in turn secured to the internally threaded portion of the annular member 26. One end of a rod 28 is connected to the center of the diaphragm 27. This rod passes through an opening in the housing member 25 and the end of the rod remote from the diaphragm 27 is connected to one end of an arm 29 which is pivoted on a pin 30, this pin being supported by an extending portion 31 of the housing member 25. One end of a connecting member 32 is secured to an end of the arm 29 by means of the pin 33, the other end of member 32 being secured to a rib 34 secured to the diaphragm 12. A diaphragm 50 similar to the diaphragm 27 is provided in the housing member 18 and a rod 51 similar to rod 28 is employed for connecting the needle arm 15 to the diaphragm.

The base portion 35 of the universal joint is secured to the partition 36 of the phonograph cabinet 10 and an extending portion of this base member extends through an opening in the partition. The end of conduit 23 engages the internally threaded extending portion of the base member 35, the upper portion of which serves as a cup for containing the fluid 24. When the fluid in conduit 23 expands, it flows through an opening 37 in member 22 and an opening 38 at the lower part of the cup portion of member 35. When the fluid in conduit 23 contracts, the flow takes place in the opposite direction. An internally threaded cover 39 engages the upper threaded portion of the base member 35. Liquid may be injected into the system through the opening which is normally closed by the screw 45.

The level of the fluid in the cup portion of member 35 should be maintained below the upper portion of the joint formed by the ball member 22 and the adjacent socket portion of base member 35 so that there will be no tendency for the liquid to flow out through the top of the universal joint. In accordance with this arrangement the conduit 23 is always completely filled with fluid at a substantially constant pressure and this fluid is maintained in firm contact with the membrane 21. The passage formed by openings 37 and 38, which leads from conduit 23 to the cup portion of member 35 is so small in cross-section that the transmission of vibratory energy through the conduit 23 is practically unaffected by the presence of this passage.

A cup member 40 attached to the conduit 19 and filled with fluid 20 is provided for maintaining the conduit 19 completely filled with the fluid at a substantially constant pressure. The fluid in the cup communicates with the fluid in the conduit through the opening 41 which is so small as to have a high mechanical impedance. A cover 42 is provided for the cup member 40 and is maintained in position by means of the screw 43.

In operation, vibrations are received by the phonograph needle and transmitted through the needle arm to the diaphragm located in the housing member 18. This diaphragm sets up waves which are propagated through the fluid contained in conduit 19. These waves actuate the membrane 21 through which the vibrations are transmitted without appreciable diminution in amplitude because of its high flexibility and small mass as compared with the constants of the hydraulic line. The waves are then propagated through the fluid in conduit 23 and serve to actuate the diaphragm 27. This diaphragm could, of course, be employed for directly radiating sound, but it has been found desirable to employ a separate sound radiating diaphragm coupled to the diaphragm 27 as shown.

What is claimed is:

1. A vibration transmission system comprising a plurality of conduits containing a fluid, means for joining two of said conduits so that one may be moved with respect to the other, and a yieldable means in contact with the fluid in both of said conduits for closing one of said two conduits.

2. A vibration transmission system comprising a plurality of conduits containing a liquid, a universal joint for connecting two of said conduits which contain liquid at different levels respectively, and a yieldable means for closing one of said two conduits in which the liquid level is higher.

3. A vibration transmission system comprising a plurality of conduits containing a fluid, means for joining two of said conduits so that one may be moved with respect to the other, a yieldable means for closing one of said two conduits and in contact with the fluid in both of said conduits, and means for maintaining the conduits substantially filled with fluid at a constant pressure.

4. A vibration transmission system comprising a plurality of substantially rigid conduits containing a liquid, a ball and socket joint connection for two of said conduits, a flexible member for closing the end of one of said conduits which is connected to the ball member of said ball and socket joint, the socket member of said joint having a cup portion containing liquid which communicates with the liquid in the other of said two conduits, the level of the liquid in said cup portion being higher than said flexible member.

5. A vibration transmission system having an input and an output portion comprising a plurality of conduits containing a liquid, vibratile means associated with said conduits at said input and ouput portions of the transmission system, respectively, for impressing vibrations upon and for receiving vibrations from said liquid, and a connection for two of said conduits which permits the movement of one with respect to the other, said connection comprising a flexible closure for one of the conduits and a reservoir containing a liquid and having a small opening therein connecting said reservoir with the second conduit, the level of the liquid in said reservoir being higher than said flexible closure.

6. A phonograph comprising means for receiving vibrations from a record, a diaphragm for radiating sound in accordance with the received vibrations, a plurality of conduits containing a liquid for transmitting said received vibrations to said diaphragm, and a connection between two of said conduits which permits the movement of one with respect to the other.

7. A phonograph comprising means for receiving vibrations from a record, a diaphragm for radiating sound in accordance with the received vibrations, said diaphragm being located remotely from said means, a plurality of conduits containing a liquid for transmitting vibrations from said vibration receiving means to said diaphragm, one of said conduits forming a support for said vibration receiving means, and a universal joint connection between said conduits to permit said vibration receiving means to follow a groove in said record and to facilitate the changing of records.

8. A phonograph comprising a cabinet, a needle for receiving vibrations from a record, a large diaphragm positioned in said cabinet for radiating sound directly into the air in accordance with the vibrations received by said needle, and a hydraulic system comprising a plurality of conduits for transmitting the received vibrations to said diaphragm.

9. A phonograph comprising a cabinet, a needle for receiving vibrations from a phonograph record, a diaphragm located in said cabinet remotely from said needle for radiating sound in accordance with vibrations impressed upon it, a plurality of conduits containing a liquid through which vibrations are transmitted from said needle to said diaphragm, a vibratile member connected to said needle for actuating said liquid, another vibratile member connected to said diaphragm for driving it when actuated by said liquid and a universal joint connection between two of said conduits which permits the movement of said needle along or away from said record.

In witness whereof, I hereunto subscribe my name this 16th day of June, A. D. 1927.

HENRY C. HARRISON.